April 26, 1949.   R. D. HILL   2,468,328
REPLACEABLE FILTER ELEMENT
Filed Feb. 8, 1944

Rolo D. Hill,
INVENTOR.

BY Hazard & Miller

ATTORNEYS

Patented Apr. 26, 1949

2,468,328

UNITED STATES PATENT OFFICE 2,468,328

REPLACEABLE FILTER ELEMENT

Rolo D. Hill, Los Angeles, Calif.

Application February 8, 1944, Serial No. 521,519

2 Claims. (Cl. 210—204)

1

This invention relates to a replaceable filter element for use in oil filters, such as are employed for filtering the oil of the crankcases of internal combustion engines.

A primary object of the invention is to provide an improved filter element of very inexpensive construction which is self-sustaining in form and which may be easily and quickly substituted for the filter element in an oil filter which has become clogged or loaded and is no longer effective.

More specifically, an object of the invention is to provide a filtering element formed of filtering material that is of a self-sustaining character having a bore or passage therethrough into which is tightly driven a tapered core which core may be made up of either a single piece or a pair of opposed pieces. Such a construction enables the filter element to be easily mounted in the container or receptacle of conventional filters, and assures that no leakage can take place between the filtering material and the core whereby all of the oil to be filtered is caused to pass through an adequate minimum length of filtering material and bypassing or channeling of the oil around the filtering material is effectively prevented.

Still a further object of the invention is to provide an improved filter element composed mainly of uniformly distributed fiberized asbestos and vegetable fibers, such as wood fiber, and to provide an effective coating on the surface thereof so that particles of the filtering material will not be loosened or abraded during handling.

Figure 1:
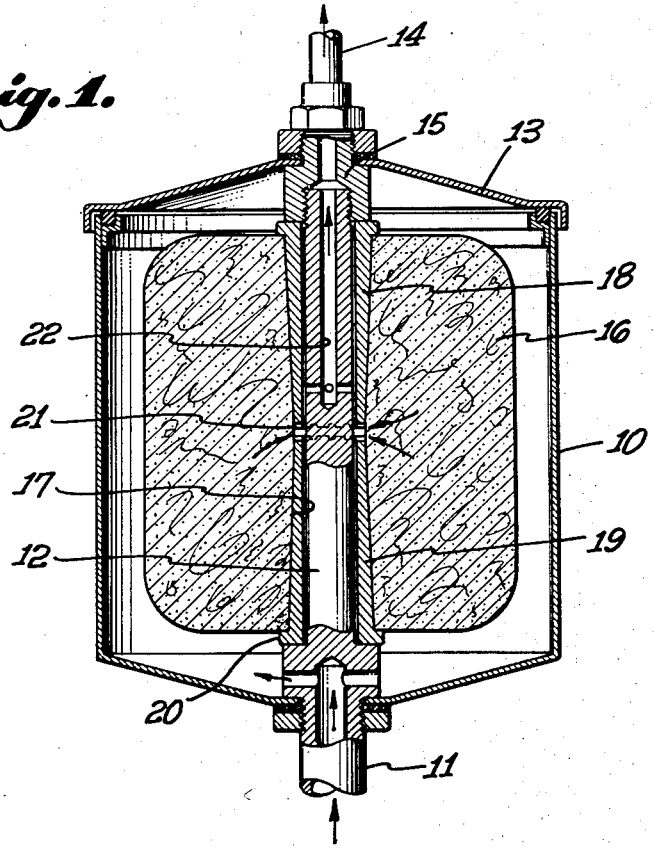
Figure 2:
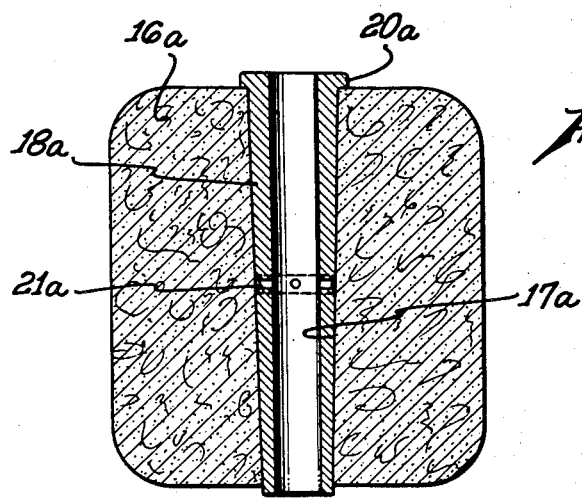

With the foregoing and other objects in view which will be made manifest in the following detailed description and specifically pointed out in the appended claims, reference is had to the accompanying drawings for an illustrative embodiment of the invention, wherein:

Figure 1 is a sectional view through a type of oil filter receptacle illustrating one form of the replaceable filter element embodying the present invention as having been mounted therein; and Fig. 2 is a vertical section through an alternative form of replaceable filter element.

Referring to the accompanying drawings wherein similar reference characters designate similar parts throughout, it will be understood that the details of construction of the receptacle or container of the filter forms no important part of the present invention. For purposes of illustration, however, there is shown a container or receptacle 10 having in its bottom an inlet 11 through which oil from the crankcase of an internal combustion engine may be supplied to the interior of the container. Usually the receptacle has a vertically extending central post 12 extending upwardly through the container, and a cover for the container indicated at 13 is provided which is maintained in closed position by the post.

The outlet from the container is indicated at 14 and for purposes of illustration a coupling structure, generally indicated at 15, serves to connect the outlet 14 to the cover and in turn connect the cover to the post. Frequently, the cover 13 is equipped with a spring actuated follower adapted to engage the filtering element.

The filter element embodying the present invention is susceptible of use in conjunction with any of the oil filter constructions embodying the above-mentioned general characteristics.

The filtering element comprises a self-sustaining mass 16 of the filtering material. This mass is preferably formed of fiberized asbestos and finely divided wood fiber, such as coarse ground or pulverized sawdust or wood shavings. Sometimes a small proportion of clipped waste may be incorporated in the filter element and other types of vegetable fiber may be employed in lieu of the coarse sawdust. When fiberized asbestos and coarse sawdust are used together without the addition of other ingredients the proportions employed are approximately 40 asbestos to 60 sawdust by weight. These ingredients are uniformly mixed together in water, it being advisable to discharge a stream of water at high velocity into a container containing the asbestos, sawdust, and water to effect a uniform dispersion. When the asbestos and sawdust are uniformly mixed a quantity thereof may be removed and placed in a suitable mold of the desired size and shape and pressure applied to form the mass into the shape of the desired filter element. Walls of the mold are either porous or have suitable outlets provided therein for egress of water that is expelled during the pressing. The mold also serves to shape or form a vertical central passage or bore 17 through the filter mass. This passage or bore in the preferred form of construction is initially shaped so as to be truly cylindrical or substantially so from end to end. After the filter mass has been shaped by the mold it is then removed and air-dried or artificially dried, producing a porous mass having desirable filtering characteristics and which is self-sustaining.

A core is provided which in the form shown in Fig. 1 consists of two opposed parts 18 and 19 which may or may not be equipped at their ends with flanges 20. These parts of the core are tubular having an internal diameter of sufficient size to enable their being passed over the post 12 with adequate clearance. They are externally tapered and are driven tightly into the ends of the cylindrical bore 17 with the result that the filtering material adjacent the ends of the bore is compressed outwardly around the pieces of the core. For purposes of economy, the pieces of the core are formed of wood, but they may be formed of other materials if desired. The wedging action produced by driving the tapered pieces of the core into the cylindrical passage or bore 17 forms a very tight joint preventing any leakage or by-passing of oil between the top and bottom of the filter mass and the core. The opposed ends of the core pieces are serrated or notched as indicated at 21 so that even if the pieces of the core are forced into mutual engagement, the notches will provide for ingress of oil to the interior of the core from which the filtered oil may pass into a passage 22 provided in the post 12 which leads to the outlet 14.

By means of this construction it will be appreciated that the improved filter element may be very economically constructed. When it is desired to replace the filter element of a filter it is merely necessary to remove the cover 13, slip the filter element off of the post and substitute another filter element therefor. Usually the coupling 15 will engage the core in such a manner as to prevent leakage between the coupling and core, and in those instances wherein the cover of the receptacle is equipped with a spring actuated follower that engages the core, the follower thus prevents leakage the action of the spring being supplemented by the pressure of the oil within the receptacle.

The operation of the filter will be manifest to those familiar with the art. Oil entering the receptacle through inlet 11 fills the receptacle and is forced to permeate the filter material 16 from the exterior surface of the filter material to the space between the opposed ends of the core pieces 18 and 19. This flow through the filter material serves to extract all solid or semi-solid impurities.

In the alternative form of construction illustrated in Fig. 2, the filter mass is indicated at 16a having a bore or passage 17a formed therethrough. In this form of construction the core 18a is formed of a single piece which is tapered from end to end and which may or may not be equipped with flanges 20a. This core piece is driven into the passage 17a and when so driven it forms a tight seal between the exterior of the core and the interior of the filter material from end to end thereof. Ports 21a are formed in this core at approximately its center providing for ingress of oil to the interior of the core. This form of construction may likewise be slipped onto the post 12 and function in a similar manner.

If the filter material is composed of fiberized asbestos, sawdust, or its equivalent with or without cotton waste, the filter material is self-sustaining in shape, there being no reenforcement or surrounding structure required. However, as the material contains no binder other than that afforded by the ingredients themselves, the exterior surface of the filter material may loosen or abrade in handling. In order to protect the filter material against such loosening or abrading action I prefer to coat it with a thin coating which, after being set, is inert to water and oil even under the high temperature conditions that may occur in oil filters. To this end I use a plastic adhesive possessing these properties. I find an adhesive sold on the market under the name of "Cascamite" by the Borden Company is highly suitable for my purposes. It is a form of casein glue which, after having been wetted with water and once set, is thereafter normally insoluble in water. This material is usually received in a powdered form and may be mixed with cold water. After being mixed it may be sprayed or brushed onto the exterior surfaces of the filter material. The proportions that I find suitable are one part "Cascamite" to six parts water by weight. This material when allowed to dry on the filter material forms an exterior film thereon that serves to bond exterior fibers of asbestos and swadust to prevent their being loosened due to handling. Once that the material has dried and set it no longer is affected by either hot water or hot oil. The film thus produced is adequate to resist abrasion of the filtering material during handling, but does not form such an impervious glaze on the exterior of the filtering material that would hinder the entry of the oil to be filtered therein.

From the above-described construction it will be appreciated that a highly economical, inexpensive, replaceable filter unit is provided which can be easily and quickly substituted for used filter elements in oil filters at a minimum expense.

Various changes may be made in the details of construction without departing from the spirit and scope of the invention as defined by the appended claims.

I claim:

1. A replaceable filtering element for oil filters and the like comprising a self-sustaining body of filtering material having an initially substantially cylindrical bore therethrough, and a pair of externally tapered tubular cores driven tightly into the bore from opposite ends thereof, the opposed edges of said cores being notched.

2. A replaceable filter element for oil filters and the like comprising a body of filtering material having a bore therethrough and a pair of tapered and flanged tubular cores driven tightly into the bore from opposite ends thereof, the opposed edges of the cores being notched.

ROLO D. HILL.

REFERENCES CITED

The following references are of record in the file of this patent:

UNITED STATES PATENTS

| Number | Name | Date |
|---|---|---|
| 1,860,229 | Briggs | May 24, 1932 |
| 1,921,309 | Crammond | Aug. 8, 1933 |
| 1,940,317 | McKinley | Dec. 19, 1933 |
| 2,041,043 | Bennett | May 19, 1936 |
| 2,078,525 | Bruesewitz | Apr. 27, 1937 |
| 2,093,090 | Manning | Sept. 14, 1937 |
| 2,103,572 | Wells | Dec. 28, 1937 |
| 2,131,004 | Austin | Sept. 20, 1938 |
| 2,144,781 | Seitz | Jan. 24, 1939 |
| 2,179,784 | Frudden | Nov. 14, 1939 |
| 2,195,272 | Ehlers | Mar. 26, 1940 |
| 2,247,377 | Hill | July 1, 1941 |
| 2,248,131 | Smith | July 8, 1941 |
| 2,345,849 | Winslow et al. | Apr. 4, 1944 |
| 2,437,082 | Davis et al. | Mar. 2, 1948 |